United States Patent [19]

Corl et al.

[11] 3,726,592

[45] Apr. 10, 1973

[54] METHOD AND APPARATUS FOR DETECTING MOISTURE

[75] Inventors: Edwin A. Corl, Wappingers Falls; Khalil S. Daghir, Poughkeepsie, both of N.Y.

[73] Assignee: International Business Machines Corporation, Armonk, N.Y.

[22] Filed: Nov. 27, 1970

[21] Appl. No.: 93,335

[52] U.S. Cl..................356/36, 250/83.3 H, 356/51, 356/74, 356/96
[51] Int. Cl........................G01n 21/10, G01n 21/34
[58] Field of Search .......................23/230 R, 253 R; 250/83.3 H; 356/51, 74–84, 88–101, 36

[56] References Cited

OTHER PUBLICATIONS

Gryvnak et al.: "Journal of the Optical Society of America," Vol. 55, No. 6 June, 1965, pages 625–629

Primary Examiner—Ronald L. Wibert
Assistant Examiner—F. L. Evans
Attorney—Hanifin & Jancin and Martin G. Reiffin

[57] ABSTRACT

A method of measuring the breakdown of the P=O bond in a phosphosilicate glass layer and thereby measuring the water transmissibility of a sputtered quartz layer superimposed on the glass layer. The intensity of the P=O absorption band at 1,325 cm$^{-1}$ is measured by an infrared spectrophotometer. The sample is then wet baked in a humid environment at an elevated temperature. The intensity of the P=O absorption band at 1,325 cm$^{-1}$ is again measured and compared with the first measurement.

11 Claims, 4 Drawing Figures

PATENTED APR 10 1973          3,726,592

INVENTORS
EDWIN A. CORL
KHALIL S. DAGHIR

BY Martin G. Reiffin

ATTORNEY

SPECTROPHOTOMETER    FIG. 5

METHOD AND APPARATUS FOR DETECTING MOISTURE

FIELD OF THE INVENTION

Many failures in integrated circuits were at one time due to corrosion of the molybdenum metallurgy. Microprobe analysis showed the corroded areas rich in phosphorus, and the layers underneath showed phosphorus depletion. The steam leach test was later devised and demonstrated that the phosphorus in the phosphosilicate glass layer gets depleted in about an hour of exposure to steam. It was inferred that moisture permeates the relatively porous pyrolytic oxide, attacking and breaking up the P=O bonds by way of the affinity of phosphorus to water. The phosphorus is then free to migrate through the pyrolytic oxide due to the concentration gradient and elevated temperature. The molybdenum acts as a sink for the migrating phosphorus.

DESCRIPTION OF THE PRIOR ART

The steam leach test involved suspension of the sample over a container of boiling water. Although satisfactory where the phosphosilicate glass layer was covered by a layer of pyrolytic oxide, the substitution of sputtered quartz for the oxide renders the leach test impractical. That is, the leach test proved ineffective in studying the leach rates through sputtered quartz layers thicker than 200 A. This is because of the slow rate of moisture transmission which rate is about 1,600 times slower than with the present invention.

SUMMARY OF THE INVENTION

It is therefore a primary object of the present invention to provide a practical and effective method and apparatus for measuring the breakdown of the P=O bond in a phosphosilicate glass layer covered by sputtered quartz.

Another important object is to provide a method and apparatus for measuring the water transmissibility through the sputtered quartz layer.

These objects are achieved by measuring the intensity of P=O absorption bond at 1,325 $cm^{-1}$ by an infrared spectrophotometer both before and after wet baking the sample in a humid environment and at an elevated temperature. The extent to which the dip in the absorption band flattens out after the wet bake is an indication of the extent of breakdown of the P=O bonds in the phosphosilicate glass layer.

It is a further object of the present invention to provide a novel and effective method for measuring humidity at high temperatures.

Other objects and advantages are either inherent in the structure and steps disclosed or will become apparent to those skilled in the art as the detailed description proceeds in connection with the accompanying drawings.

BRIEF DESCRIPTION OF THE DRAWINGS

FIG. 5 is a symbolic view showing a spectrophotometer.

DESCRIPTION OF THE PREFERRED EMBODIMENT

Figure 1:
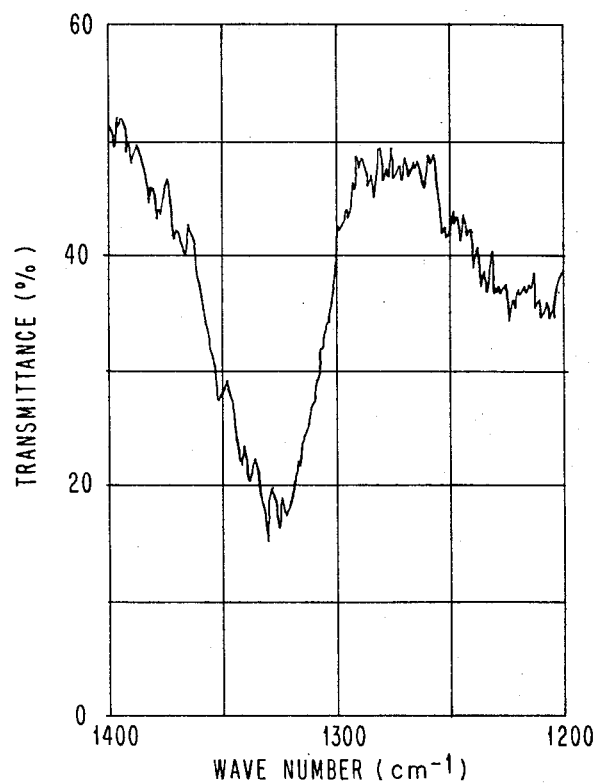
FIG. 1 is a spectrophotograph taken before the wet bake step.

Referring first to FIG. 1, there is shown a spectrophotograph showing the infrared transmittance of a sample comprising a phosphosilicate glass layer covered by a layer of sputtered quartz. It will be noted that at a wave number of 1,325 $cm^{-1}$ there is a sharp dip in the transmittance curve. This dip is due to the absorption band arising from the P=O bonds in the phosphosilicate glass layer.

Figure 2:
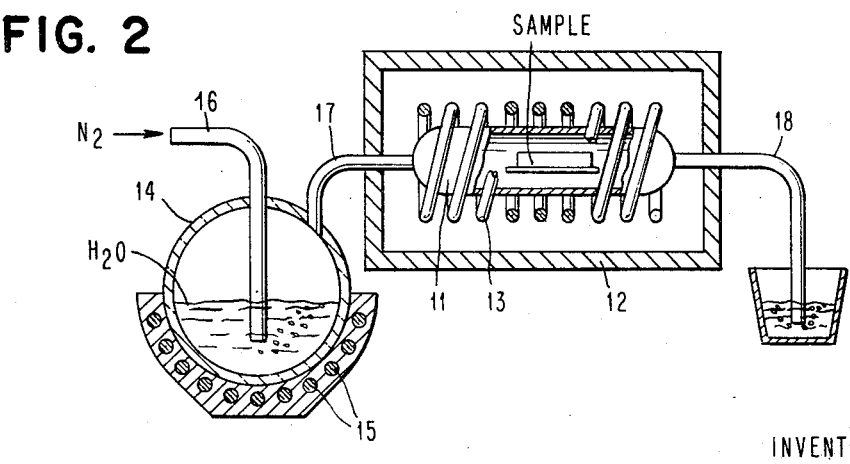
FIG. 2 is a schematic representation of the wet bake step.

The sample is then wet-baked in the manner shown in FIG. 2. The sample is placed within a tube 11 located within a furnace 12 having heating elements 13. A container 14 of water is heated by heating elements 15. A tube 16 is provided to supply nitrogen to the water within container 14 and to convey the steam vapor through pipe 17 and then through tube 11 from where it leaves by way of tube 18.

Figure 3:
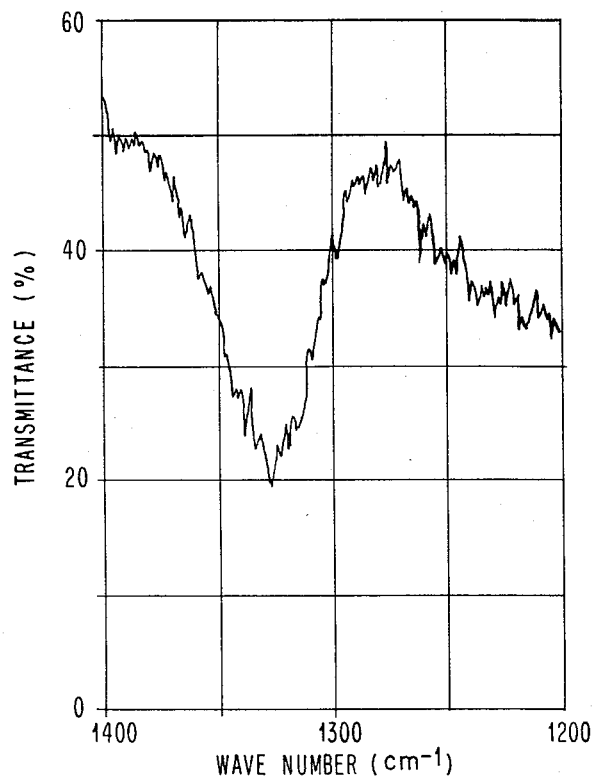
FIG. 3 is a spectrophotograph taken after an initial wet bake step.
Figure 4:
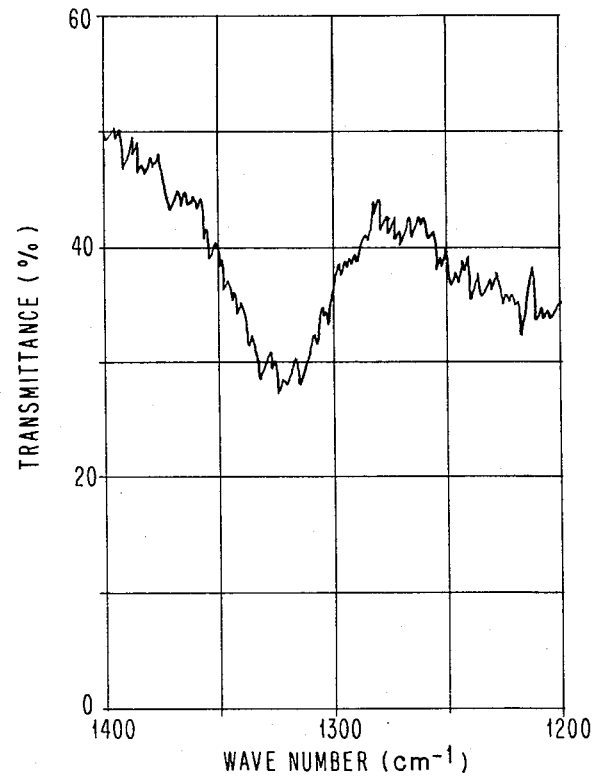
FIG. 4 is a spectrophotograph taken after further wet baking.

After ½ hour of wet baking at a furnace temperature of 175° C and a water temperature of 85° C, the sample is again subjected to an infrared spectrophotometer measurement with the results shown in FIG. 3. After 2 hours of wet baking at a furnace temperature of 175° C and a water temperature of 85° C the sample is again subjected to an infrared spectrophotometer measurement to obtain the graph shown in FIG. 4. It will be seen that the dip in the transmittance wave at a wave number of 1,325 $cm^{-1}$ is reduced by the wet bake treatment. This indicates that some P=O bonds in the phosphosilicate glass layer have been broken. If the wet-bake step shown in FIG. 2 is carried on for a sufficient length of time and at a suitably elevated temperature, the dip in the absorption band will eventually disappear indicating that all the P=O bonds have been broken.

The present invention may also be used for the measurement of humidity, particularly at high temperatures. For example, if it is desired to measure the humidity within a furnace an object having a phosphosilicate glass layer is first subjected to infrared spectrophotometer measurements to determine the intensity of the absorption band at a wave number of 1,325 $cm^{-1}$. The object is then placed within the furnace for a predetermined time period. Infrared spectrophotometer measurements are then made again and compared with the original measurement. The extent to which the dip at 1,325 $cm^{-1}$ is reduced is then observed to determine the humidity within the furnace.

It is to be understood that the specific embodiment shown in the drawings and described above is merely illustrative of one of the many forms which the invention may take in practice without departing from the scope of the invention delineated by the appended claims which are to be construed as broadly as permitted by the prior art.

We claim:

1. A method of measuring the breakdown of a chemical bond in a layer on a component, and comprising the steps of measuring the spectrophotometric intensity of an absorption band of the component, heating the component in a humid environment
measuring again the spectrophotometric intensity of the absorption band, and
comparing the results of said two measuring steps.

2. A method of measuring the water penetrability of a passivation layer on a component and comprising the steps of measuring the infrared spectrophotometic intensity of an absorption band of the component,
   wet baking the component in a humid environment at an elevated temperature,
   measuring again the infrared spectrophotometic intensity of the absorption band, and
   comparing the results of said two measuring steps.

3. A method of measuring the breakdown of a chemical P=O bond in a layer on a component and comprising the steps of
   measuring the intensity of the P=O spectrophotometric absorption band of the component,
   exposing the passivation layer to a humid environment at an elevated temperature,
   measuring again the intensity of the P=O spectrophotometric absorption band, and
   comparing the results of said two measuring steps.

4. A method of measuring the breakdown of a P=O bond in a phosphosilicate glass layer on a component and comprising the steps of
   measuring the intensity of the P=O absorption band of the component,
   wet baking the component in a humid environment at an elevated temperature,
   measuring again the intensity of the P=O absorption band, and
   comparing the results of said two measuring steps.

5. A method of measuring the water transmissibility of a passivation layer of sputtered quartz covering a phosphosilicate glass layer on a component, and comprising the steps of
   measuring the spectrophotometric intensity of the P=O absorption band of the component at about 1,325 cm$^{-1}$,
   heating the passivation layer in a humid environment,
   measuring again the spectrophotometic intensity of the P=O absorption band at about 1,325 cm$^{-1}$, and
   comparing the results of said two measuring steps.

6. An apparatus for measuring the penetrability of a layer on a component, and comprising
   means for measuring by spectrophotometer the intensity of an absorption band of the component, and
   means for exposing the layer to a humid environment.

7. An apparatus for measuring the water penetrability of a passivation layer on a component, and comprising
   means for measuring by infrared spectrophotometer the intensity of the absorption band of the component, and
   furnace means for exposing the passivation layer to a humid environment at an elevated temperature.

8. An apparatus for measuring the breakdown of a P=O bond in a layer on a component, and comprising
   means for measuring by infrared spectrophotometer the intensity of the P=O absorption band of the component, and
   furnace means for exposing the passivation layer to a humid environment at an elevated temperature.

9. An apparatus for measuring the water penetrability of a passivation layer of sputtered quartz covering a phosphosilicate glass layer on a component, and comprising
   means for measuring by infrared spectrophotometer the intensity of the P=O absorption band of the component, and
   furnace means for wet baking the passivation layer in a humid environment at an elevated temperature.

10. An apparatus for measuring the breakdown of a P=O bond in a phosphosilicate glass layer on a component, and comprising
    means for measuring by infrared spectrophotometer the intensity of the P=O absorption band of the component at about 1,325 cm$^{-1}$, and
    furnace means for exposing the passivation layer to a humid environment at an elevated temperature.

11. A method of measuring humidity within an enclosure comprising the steps of
    placing on a component a layer of phosphosilicate glass,
    measuring the spectrophotometric intensity of an absorption band of the component,
    placing the component within the enclosure to be measured,
    measuring again the spectrophotometric intensity of the absorption band, and
    comparing the results of the two measuring steps.

* * * * *